United States Patent
Ueno

(10) Patent No.: US 11,433,688 B2
(45) Date of Patent: Sep. 6, 2022

(54) PRINTER

(71) Applicant: RISO KAGAKU CORPORATION, Tokyo (JP)

(72) Inventor: Ryo Ueno, Ibaraki (JP)

(73) Assignee: RISO KAGAKU CORPORATION, Tokyo (JP)

(*) Notice: Subject to any disclaimer, the term of this patent is extended or adjusted under 35 U.S.C. 154(b) by 211 days.

(21) Appl. No.: 16/634,381

(22) PCT Filed: Mar. 12, 2018

(86) PCT No.: PCT/JP2018/009446
§ 371 (c)(1),
(2) Date: Jan. 27, 2020

(87) PCT Pub. No.: WO2019/044005
PCT Pub. Date: Mar. 7, 2019

(65) Prior Publication Data
US 2020/0316961 A1  Oct. 8, 2020

(30) Foreign Application Priority Data
Aug. 30, 2017 (JP) .............................. JP2017-165749

(51) Int. Cl.
*B41J 25/308* (2006.01)
*B41J 3/44* (2006.01)
(Continued)

(52) U.S. Cl.
CPC ................ *B41J 3/28* (2013.01); *B41J 2/175* (2013.01); *B41J 3/44* (2013.01); *B41J 21/16* (2013.01);
(Continued)

(58) Field of Classification Search
CPC ....... B41J 3/28; B41J 2/175; B41J 3/44; B41J 21/16; B41J 25/308; B41J 3/445;
(Continued)

(56) References Cited

U.S. PATENT DOCUMENTS

| 8,922,817 B2 | 12/2014 | Matsumoto | |
| 2005/0090945 A1* | 4/2005 | Bodin | G05D 1/0044 |
| | | | 701/2 |

(Continued)

FOREIGN PATENT DOCUMENTS

| JP | 2006-150670 A | 6/2006 |
| JP | 2014-184721 A | 10/2014 |

(Continued)

OTHER PUBLICATIONS

International Search Report issued in International Patent Application No. PCT/JP2018/009446, dated Apr. 10, 2018 and English translation.

*Primary Examiner* — Yaovi M Ameh
(74) *Attorney, Agent, or Firm* — Greenblum & Bernstein, P.L.C.

(57) ABSTRACT

A desired image is printed in a non-contact state on a print object surface with a flyable printer in which a printing device is mounted in a flying object. The printer includes a flying object having a body part, a controller, and a drive part; and a print head, mounted in the flying object, to print a desired image in a non-contact state, on a print object which the flying object has approached. The print head is driven while a gap is maintained at a predetermined value by bringing a gap adjustment part attached to the body part of the flying object into contact with the print object or by accurate control of the drive part. It is possible to print a desired image in good image quality regardless of the state of the surface of the print object.

10 Claims, 19 Drawing Sheets

(51) Int. Cl.
  *B64C 39/02* (2006.01)
  *B41J 3/28* (2006.01)
  *B41J 2/175* (2006.01)
  *B41J 21/16* (2006.01)
  *B64C 27/08* (2006.01)
  *B64D 47/08* (2006.01)
  *B41J 2/01* (2006.01)

(52) U.S. Cl.
  CPC ............ *B41J 25/308* (2013.01); *B64C 27/08* (2013.01); *B64C 39/024* (2013.01); *B64D 47/08* (2013.01); *B41J 2/01* (2013.01); *B41J 3/445* (2013.01); *B64C 2201/027* (2013.01); *B64C 2201/12* (2013.01)

(58) Field of Classification Search
  CPC .......... B41J 2/01; B64C 27/08; B64C 39/024; B64C 2201/12; B64C 2201/027; B64D 47/08
  See application file for complete search history.

(56) References Cited

U.S. PATENT DOCUMENTS

| | | |
|---|---|---|
| 2014/0285825 A1 | 9/2014 | Matsumoto |
| 2015/0274294 A1* | 10/2015 | Dahlstrom ............ E04G 23/002 239/722 |
| 2015/0344136 A1 | 12/2015 | Dahlstrom |
| 2016/0068261 A1 | 3/2016 | Niederberger |
| 2017/0190104 A1* | 7/2017 | Bostick .................. B33Y 10/00 |
| 2017/0209885 A1* | 7/2017 | Neustadt ................ B05B 15/62 |
| 2017/0291439 A1* | 10/2017 | Koyata .................. B41J 3/4073 |

FOREIGN PATENT DOCUMENTS

| | | |
|---|---|---|
| JP | 2016-16535 A | 2/2016 |
| JP | 2016-522113 A | 7/2016 |
| JP | 2017-185758 A | 10/2017 |
| JP | 2018-96770 | 6/2018 |
| WO | 2017/094842 | 6/2017 |

* cited by examiner

PRINTER

TECHNICAL FIELD

The present invention relates to a printer formed by mounting a print head on an unmanned flying object called drone, and more particularly, to a printer capable of flying to approach a print object, and forming a desired image in a non-contact state with respect to the print object.

BACKGROUND ART

The following Patent Literature 1 discloses an invention of a multicopter. In the multicopter 3, a self-elevating structure 1, having plural rotors 11, is provided with a vacuum suction unit 2 and a cleaning device 4. The multicopter has a flight performance of automatically flying by itself to arrive at the surface in a target position, moving on the surface by itself, and moving away from the surface. According to this invention, the cleaning device 4 may be replaced with a printing device 4.

CITATION LSIT

Patent Literature

Patent Literature 1: Japanese Unexamined Patent Application Publication (Translation of PCT Application) No. 2016-522113

SUMMARY OF INVENTION

Technical Problem

According to the description of the above-described Patent Literature 1, the printing device 4 of the multicopter has a roller-shaped structure. It is conceivable that the printing device 4 is an applying roller to apply coating material in contact with a target. Accordingly, it is conceivable that the multicopter clings to a wall surface or the like of a moving destination with the suction device, brings the applying roller of the printing device into contact with the wall surface, and in that state, performs printing on the wall surface with the applying roller while driving the rotors to move along the wall surface.

According to the invention disclosed in the above-described Patent Literature 1, since the multicopter performs printing in contact with the print object surface, it is conceivable that printing is impossible, or printing cannot be performed without difficulty, in accordance with state of the print object surface. Especially, it is assumed that in many cases, the printer in which the applying roller is mounted in the flying object flies to a remote place or a place difficult to approach at normal times to perform printing operation. However, it is conceivable that in some cases, even when the multicopter has arrived at the remote place or place difficult to approach and it is found that the print object surface is not appropriate to contact printing, no appropriate countermeasure can be taken. Further, in the method of bringing the applying roller into contact with a print object surface and applying coating material while moving the applying roller, although it is possible to perform an operation to coat the coating material in a planned brief shape, it is generally difficult to print an image in a desired pattern.

The invention has been made in view of the conventional technique and its problem, and has an object to provide a flyable printer in which a printing device is mounted in a flying object, capable of printing a desired image on a print object surface at which the printer has flown and arrived, in a non-contact state.

Solution to Problem

A printer described in claim 1 has:
a flying object; and
a print head, mounted in the flying object, that prints a desired image, in a non-contact state, on a print object which the flying object has approached.

Advantageous Effects of Invention

According to the printer described in claim 1, by flying the flying object from a departure point to the vicinity of the print object and driving the print head, in a non-contact state with respect to the print object, it is possible to print a desired image on the print object.

BRIEF DESCRIPTION OF DRAWINGS

FIG. 3A is a schematic diagram showing a state of image printing by moving the flying object with the position of the print head fixed.

FIG. 3B is a schematic diagram showing the state of image printing by moving the print head with the position of the flying object fixed.

FIG. 4A is a schematic diagram showing the configuration of the print head and variation of the moving direction of the print head.

FIG. 4B is a schematic diagram showing the configuration of the print head and variation of the moving direction of the print head.

FIG. 4C is a schematic diagram showing the configuration of the print head and variation of the moving direction of the print head.

FIG. 4D is a schematic diagram showing the configuration of the print head and variation of the moving direction of the print head.

FIG. 4E is a schematic diagram showing the configuration of the print head and variation of the moving direction of the print head.

FIG. 4F is a schematic diagram showing the configuration of the print head and variation of the moving direction of the print head.

FIG. 5A is a schematic diagram showing a state where the distance is maintained by controlling the flying object.

FIG. 5B is a schematic diagram showing a state where the distance is maintained with a gap adjustment part provided in the flying object.

FIG. 6A shows variation of a gap adjustment mechanism.

FIG. 6B shows variation of the gap adjustment mechanism.

FIG. 6C shows variation of the gap adjustment mechanism.

FIG. 7A is a schematic diagram showing a configuration where the respective parts are accommodated in the same casing.

FIG. 7B is a schematic diagram showing a configuration where the respective parts are flyable independently of each other.

FIG. 7C is a schematic diagram showing a configuration where the respective parts are connectable or separable to/from each other.

FIG. 10A is a schematic diagram of a single printer.

FIG. 10B is a schematic diagram of a state where two printers shown in FIG. 10A are connected.

FIG. 11A is a schematic diagram showing an example where a predetermined image is printed through a shortest print path by using the single print head of the single printer.

FIG. 11B is a schematic diagram showing an example where the predetermined image is printed through the shortest print path with two print heads of two connected printers.

FIG. 11C is a schematic diagram showing an example where a predetermined figure is printed through the shortest print path by using two printers of the single printhead and by simultaneously driving the printers respectively independently.

FIG. 11D is a schematic diagram showing an example where the predetermined image is printed through the shortest print path with three print heads of three connected printers.

FIG. 11E is a schematic diagram showing an example where the predetermined image is printed through the shortest print path by using two sets of three connected printers and by simultaneously driving the printers respectively independently.

MODE FOR CARRYING OUT INVENTION

The printer according to an embodiment of the present invention is a device in which a print head is mounted in an unmanned flying object also called "drone". The flyable printer can fly by remote control or autonomously fly, and print a desired image in a non-contact state with respect to a print object which the printer has approached. The printer having the above configuration, itemized by constituent, control, or other elements, will be described with reference to FIG. 1 to FIG. 11.

1. Basic Configuration of Flying Object (FIG. 1)

Figure 1:
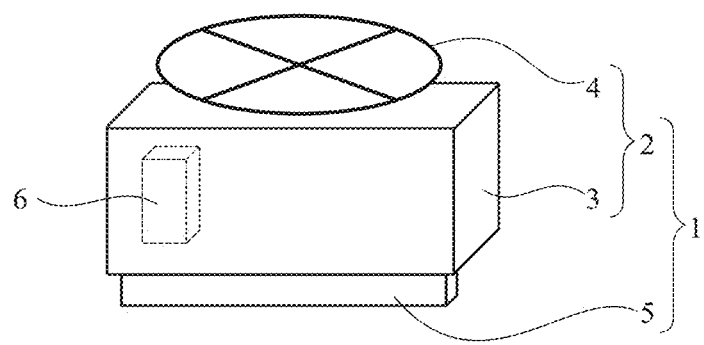
FIG. 1 is a schematic diagram showing a basic configuration of a printer according to an embodiment.

As shown in FIG. 1, a flyable printer 1 according to the embodiment has an unmanned flying object 2 also called "drone", and a print head 5 mounted in the flying object 2. The flying object 2 has a body part 3, and a drive part 4 which is mounted in the body part 3 and which flies the body part 3. The drive part 4 is configured with a single or plural propellers, and a motor or the like to drive the propeller. The drive part 4 may be other moving means or propulsion means than the propeller. The print head 5 is attached to a predetermined position of the body part 3. In the example shown in FIG. 1, the print head 5 is attached to a lower surface of the body part 3.

Note that even when the flying object 2 has the propeller as the drive part 4, the flying object 2 does not necessarily fly with the propeller at the top. For example, the flying object 2 can perform printing on a vertical wall with the print head 5 while flying with the propeller set sideways and with the body part 3 toppled sideways. Further, the flying object 2 can perform printing on a ceiling with the print head 5 while flying with the propeller faced down and with the body part 3 upside down. The flying object 2 having other drive part 4 than the propeller can also perform printing in the above states.

As shown in FIG. 1, a controller 6 is accommodated in the body part 3. The controller 6 controls the drive part 4 and the print head 5, in addition, integrally controls other devices mounted in the body part 3. When the controller 6 controls the drive part 4 and the like to fly the flying object 2, the flight may be remote-controlled flight or may be autonomous flight.

That is, in the case of the remote control, when the operator transmits a maneuvering signal from a control device, then the flying object 2 receives the maneuvering signal, generates a control signal based on flight control information included in the maneuvering signal to control the drive part 4 and the like, and flies the flying object 2, under the control of the controller 6. The flying object 2 can approach a print position, and maintain a non-contact state appropriate to printing with the print head 5. Note that the controller 6 generates a print signal based on print control information included in the maneuvering signal, and with the print signal, controls the print head 5 to form a designated image on the print object.

Further, in the case of autonomous flight, a program necessary for the autonomous flight, necessary flight control information and print control information are stored in a memory of the controller 6 before flight. The flying object 2 autonomously performs a series of operations, i.e., after the takeoff from a departure point, flying toward a print object, approaching a print position, and printing a designated image while maintaining a non-contact state.

Note that the control of the printer 1 with the controller 6 is not limited to the control described in the present section. Controls related to other functions of the present printer 1 will be described as needed in the following respective sections.

Although not shown in FIG. 1, an ink tank as an ink supply source, a motor for the propeller, and a battery to supply electric power to a pump of the ink tank are provided in the body part 3.

2. Print Head 5 (FIG. 2)

As shown in FIG. 2, as the print head 5 (also referred to as "ink-jet head" or "IJ head") mounted in the printer 1 according to the embodiment, a serial head 5a and a line head 5b are given. Both of the print heads 5 have an ink droplet generation mechanism to discharge ink in the form of droplet by various principles. As the ink droplet generation mechanism, publicly-known thermal method and piezoelectric method are known. However, the mechanism is not limited to these methods.

Figure 2A:
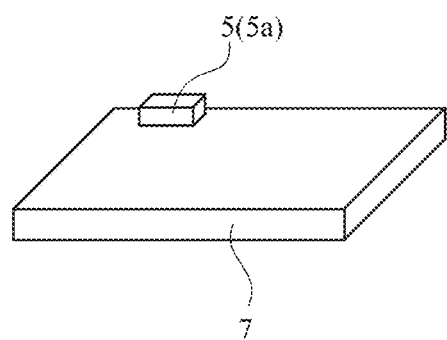
FIG. 2A is a schematic diagram showing a configuration example of a print head which is mounted in the printer according to the embodiment and which performs printing on a print object.

In the serial head 5a shown in FIG. 2(a), the number of nozzles to discharge ink is relatively small in comparison with the line head 5b to be described later. When the serial head 5a is used in a general ink-jet printing device, printing is performed while the serial head is moved in one direction of the depth direction along the surface of paper corresponding to the print object 7 in FIG. 2A. When printing for one line is completed, the paper corresponding to the print object 7 in the figure is moved in one direction of the left and right direction in the figure by a predetermined pitch, then printing is performed again while the serial head 5a is moved in the other direction of the depth direction in the figure. This scanning is repeated to form an image on the entire surface of the print sheet. Further, the printing with the serial head 5a may be performed by another method without movement of the print sheet as described below, than the method of moving the print sheet as described above. That is, when printing is performed while the print head is moved in one direction of the depth direction in FIG. 2A, and when printing for one line is completed, the serial head 5a is moved in one direction of the left and right direction in the figure by a predetermined pitch. Then printing is performed again while the serial head 5a is moved in the other direction of the depth direction in the figure. This scanning is repeated to form an image on the entire surface of the print sheet.

Figure 2B:
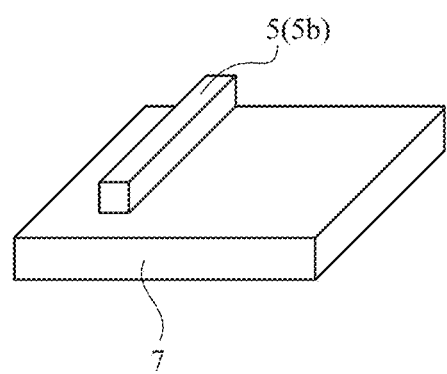
FIG. 2B is a schematic diagram showing a configuration example of the print head which is mounted in the printer according to the embodiment and which performs printing on the print object.

In the line head 5b shown in FIG. 2B, the number of nozzles to discharge ink is relatively large in comparison with the above-described serial head 5a. When the line head 5b is used in the general ink-jet printing device, assuming that the depth direction of the paper corresponding to the print object 7 in FIG. 2B is the width direction of the paper, the length of the nozzle array of the line head 5b exceeds the print area. An image is formed on the entire surface of the print sheet by driving the line head 5b while moving the paper corresponding to the print object 7 in the figure in one direction of the left and right direction in the figure. Further, the printing with the line head 5b may be performed by stopping the print sheet in place of moving the print sheet and moving the line head 5b in a direction orthogonal to the longitudinal direction, than the method with movement of the print sheet as described above.

3. Moving Direction of Flying Object 2 or Print head 5 Upon Printing (FIG. 3)

The moving direction of the flying object 2 or the print head 5 upon printing will be described.

When an image is printed on paper with the serial head 5a or the line head 5b in the general ink-jet printing device, as described above, printing can be performed only by movement of the print head 5 itself, and printing can also be performed by moving both of the print head 5 and the print sheet. On the other hand, in the present embodiment, the print head 5 is movable with the flying object 2. However, the print object 7 includes not only the print sheet but also the ground and outer surface of buildings which cannot be moved normally, other heavy objects, and the like. When an image is formed on these print objects 7, printing may be performed by moving the flying object 2 and also moving the print head 5, or printing may be performed only by moving the print head 5 itself while fixing the position of the flying object 2.

FIG. 3 is a diagram showing the structure of a printer 1a according to the embodiment and an operating state upon image printing.

Figure 3A:
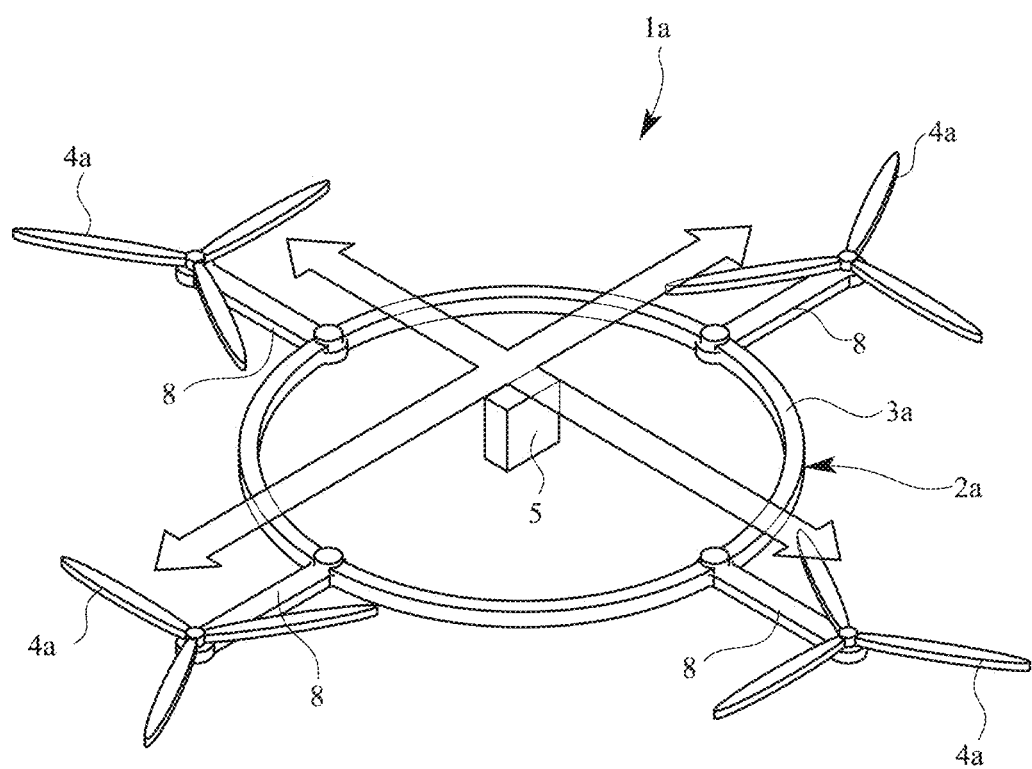
FIG. 3A is a diagram showing an operating state upon image printing in the printer according to the embodiment.
Figure 3B:
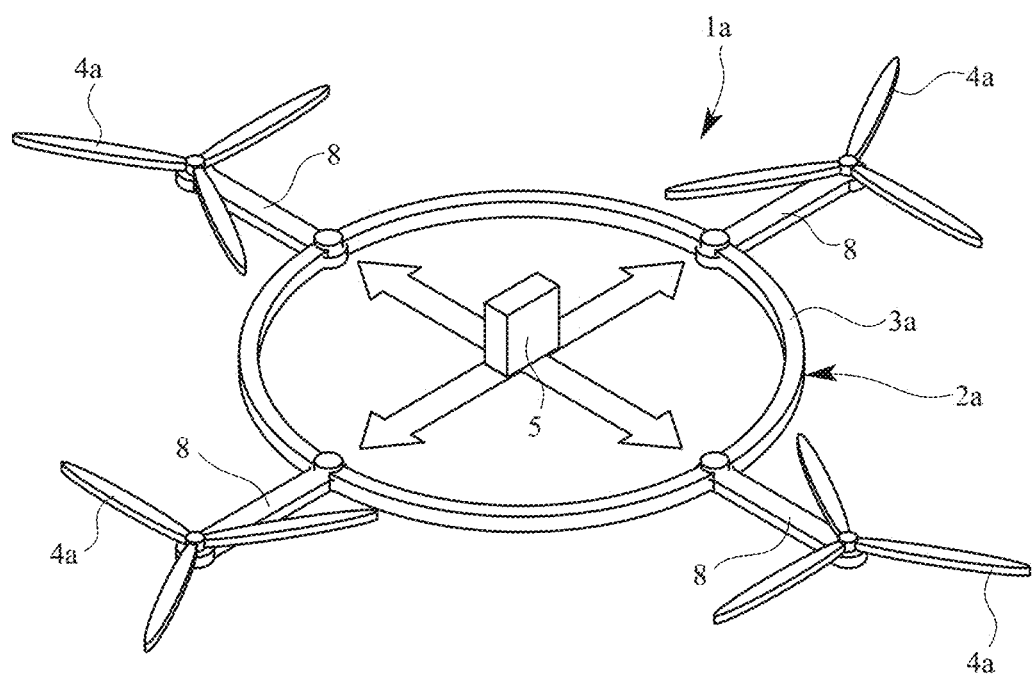
FIG. 3B is a diagram showing the operating state upon image printing in the printer according to the embodiment.

In both of FIG. 3A and FIG. 3B, the structure differs from the flying object 2 in the schematic structural diagram shown in FIG. 1. That is, the structural example of the flying object 2a shown in FIG. 3, an annular frame 3a is used as the body part 3. The annular frame 3a is provided with four arms 8 projecting outward along a radial direction, at an equal 90 degrees interval regarding the central angle of the annular frame 3a. A propeller 4a as the drive part 4 is provided at the end of the respective arms 8. The propeller 4a is driven with an unshown motor or the like. The print head 5 is provided on the inner side of the annular frame 3a. The mechanism of mounting of the print head is different between FIG. 3A and FIG. 3B.

In the example shown in FIG. 3A, the print head 5 is attached with an unshown fixing structure to the center of the annular frame 3a on the inner side. The print head 5 does not move with respect to the annular frame 3a. An opening surface of the nozzle of the print head 5 is projected slightly downward from the lower surface of the annular frame 3a and is parallel to a plane including the annular frame 3a.

To form an image with the printer 1a on the print object 7, by driving the print head 5 while moving the flying object 2a within a printing surface of the print object 7, and at the same time by maintaining the distance between the flying object 2a or the print head 5 and the print object 7 at a predetermined value, a desired image is printed on the print object 7. That is, upon printing, the controller 6 drives the print head 5 while moving the flying object 2a in a necessary direction, to form an image on the print object 7. As indicated with two bidirectional arrows orthogonal to each other in FIG. 3A, the flying object 2 can perform necessary positioning within the plane of the annular frame 3a by moving in at least two different directions within the plane of the annular frame 3a. In FIG. 3A, the print head 5 is fixed. However, even when the print head 5 is movable as in the case of FIG. 3B described next, it is possible to obtain the same advantage by moving the flying object 2 without moving the print head 5.

In the example shown in FIG. 3B, the print head 5 is attached with an unshown moving mechanism to the center of the annular frame 3a on the inner side. Within the plane including the annular frame 3a, the print head 5 is arbitrarily movable regarding the two directions indicated with the arrows orthogonal to each other in the figure. The opening surface of the nozzle of the print head 5 is projected slightly downward from the lower surface of the annular frame 3a and is parallel to a plane including the annular frame 3a.

To form an image with the printer 1a on the print object 7, the position of the flying object 2a within the horizontal surface is fixed while the distance between the flying object 2a or the print head 5 and the print object 7 is maintained at a predetermined value. That is, hovering is performed in the state where the position of the flying object 2a is fixed with respect to the print object 7. By driving the print head 5 in this state, a desired image is printed on the print object 7. That is, upon printing, the controller 6 drives the print head 5 while maintaining the state where the flying object 2a is floated in a predetermined position, to form an image on the print object 7. As indicated with two bidirectional arrows orthogonal to each other in the plane of the annular frame 3a in FIG. 3B, by moving the print head 5 in at least two different directions, it is possible to form an image at least within the movable range of the print head 5. In FIG. 3B, image formation is performed by moving the print head 5 in the two directions in the state where the flying object 2 is stopped in the predetermined position. Further, it is possible to form a larger image continued from a previous image by moving the flying object 2, after image formation in one position, to an adjacent position, and similarly performing printing.

Note that the flying object 2 is caused to hover so as to maintain the distance from the flying object 2a to the print object 7 at a predetermined value. It may be configured such that the flying object 2a lands, with a landing leg to maintain the distance at the predetermined value, on the print object 7, to stand still, then printing is performed while the print head 5 is moved. Note that the "distance" between the print head 5 and the print object 7 will be described as a "gap" later, and the "landing leg" will be described as a "gap adjustment part" later.

4. Moving Direction Upon Printing with Print Head 5 on Print Object 7 (FIG. 4)

FIG. 4A to FIG. 4F are schematic diagrams showing the configuration of the print head 5 mounted in the printer 1 or 1a and variation of the moving direction of the print head 5.

Note that in the respective figures, the print object 7 is represented as a plate-shaped member. However, this is schematic expression. The actual print object 7 is, e.g. a part of the ground, buildings and the like, or print sheet, and the like. As described above, the print head 5 performs printing in the state where the predetermined distance is maintained from the surface of the print object 7. Further, the arrows in the respective figures indicate the moving directions of the print head 5. In the case of two directions orthogonal to each other in a plane, as in the case of printing on a print sheet, these two directions are referred to as "main scanning direction" (depth direction in the figure) and "sub-scanning direction" (left and right direction in the figure). However, there is no substantial difference between the "main" and "sub" terms.

Figure 4A:
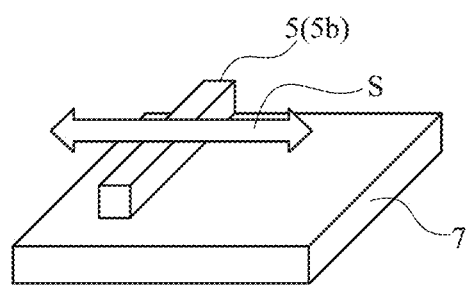
FIG. 4A is a diagram explaining a moving direction upon printing on the print object with the print head mounted in the printer according to the embodiment.

In FIG. 4A, the line head 5b is used as the print head 5. Assuming that the nozzle array direction (longitudinal direction) of the line head 5b is a main scanning direction M, it is possible to print a desired image by moving the print head 5 in a sub-scanning direction S orthogonal to the main scanning direction. The movement of the line head 5b to the sub-scanning direction S may be performed by moving the line head 5b in the sub-scanning direction in a state where the flying object 2 or 2a stands still in a predetermined position, or may be performed by moving the flying object 2 or 2a relatively in the same direction in the state where the line head 5b stands still.

Figure 4B:
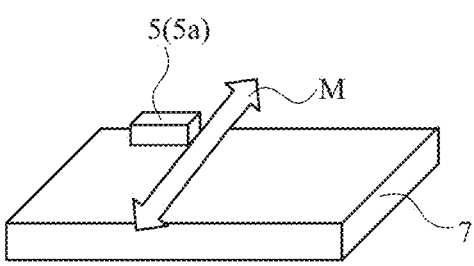
FIG. 4B is a diagram explaining the moving direction upon printing on the print object with the print head mounted in the printer according to the embodiment.

In FIG. 4B, the serial head 5a is used as the print head 5. Upon printing, the serial head 5a is moved in the main scanning direction M. The movement of the serial head 5a in the sub-scanning direction S with respect to the print object 7 may be performed by actually moving the serial head 5a in the sub-scanning direction S in the state where the flying object 2 or 2a stands still in the predetermined position, or may be performed by moving the flying object 2 or 2a in the sub-scanning direction S in the state where the serial head 5a stands still.

Figure 4C:
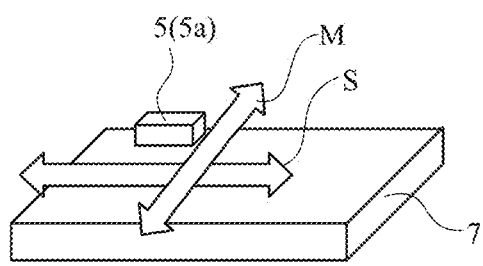
FIG. 4C is a diagram explaining the moving direction upon printing on the print object with the print head mounted in the printer according to the embodiment.

In FIG. 4C, the serial head 5a is used as the print head 5. Upon printing, the serial head 5a is moved in the main scanning direction M and the sub-scanning direction S. By moving the serial head 5a in the main scanning direction M and the sub-scanning direction S in the state where the flying object 2 stands still in the predetermined position, it is possible to print a desired image within a movable range of the serial head 5a. After the printing, by moving the flying object 2 or 2a to an adjacent area to the range and performing printing, it is possible to print a series of continuous images over the range covered with one printing by plural times of printing.

Note that in the above-described FIG. 4A, FIG. 4B, and FIG. 4C, the linear movement of the print head 5 may be performed by using publicly-known guide mechanism and moving mechanism.

Figure 4D:
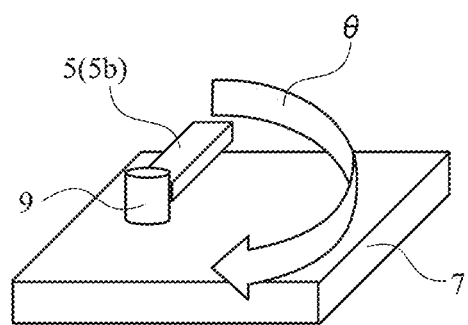
FIG. 4D is a diagram explaining the moving direction upon printing on the print object with the print head mounted in the printer according to the embodiment.

In FIG. 4D, the line head 5b is used as the print head 5. One end of the line head 5b is fixed to a rotary shaft 9 as a rotary movement mechanism attached to the body part 3 of the flying object 2. Upon printing, it is possible to set the line head 5b in a desired angle position regarding a rotation direction q by driving the rotary shaft 9.

Accordingly, it is possible to print a desired image regarding a circular range as the rotation range of the line head 5b by driving the line head 5b while rotating the line head 5b.

Note that in this case, among the respective nozzles of the line head 5b, the nozzle on the outer peripheral side with respect to the rotary shaft 9 has a higher speed. Accordingly, it is necessary to adjust dot pitch interval and the number of drops of discharged ink droplets. After the printing, by driving the flying object 2 to move the flying object 2 to an adjacent area and performing printing, it is possible to print a series of continuous images over the range covered with one printing by plural times of printing.

Figure 4E:
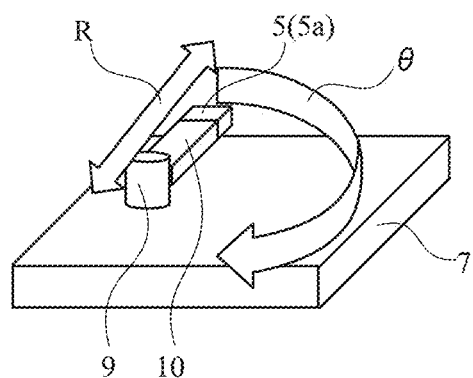
FIG. 4E is a diagram explaining the moving direction upon printing on the print object with the print head mounted in the printer according to the embodiment.

In FIG. 4E, the serial head 5*a* is used as the print head 5. The serial head 5*a* is attached to a mechanism for rotation and linear movement attached to the body part 3 of the flying object 2. The mechanism has the rotary shaft 9 rotatably attached to the body part 3 so as to adjust the angle (radian), and a linear motion mechanism 10, attached to the rotary shaft 9, to be arbitrarily extended or contracted regarding a radial direction R of the rotary shaft. The serial head 5*a* is attached to the end of the linear motion mechanism 10. According to this mechanism, it is possible to set the linear motion mechanism 10 in a desired angle position regarding the rotation direction θ by driving the rotary shaft 9. Further, it is possible to set the serial head 5*a* at the end of the linear motion mechanism 10 in a desired position regarding the radial direction R by expansion/contraction of the linear motion mechanism 10.

Accordingly, upon printing, it is possible to print a desired image regarding the circular range as a rotation range of the serial head 5*a* by driving the rotary shaft 9 and the linear motion mechanism 10 while driving the serial head 5*a*. After the printing, by driving the flying object 2 or 2*a* to move the flying object 2 or 2*a* to an adjacent area and performing printing, it is possible to print a series of continuous images over the range covered with one printing.

Figure 4F:
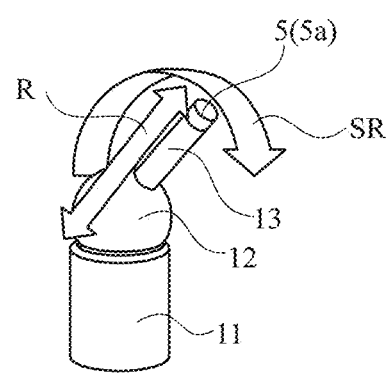
FIG. 4F is a diagram explaining the moving direction upon printing on the print object with the print head mounted in the printer according to the embodiment.

Note that in the above-described FIG. 4A to FIG. 4E, it is assumed that the printing surface of the print object 7 is a plane. In FIG. 4F described next, the printing is performed in accordance with the printing surface which is a concave surface.

In FIG. 4F, the serial head 5*a* is used as the print head 5. The serial head 5*a* is attached to a solid angle movement mechanism having a function as a universal joint provided in the body part 3 of the flying object 2. The mechanism has a cylindrical base 11 attached to the body part 3, a spherical joint 12 rotatably attached in an opening provided at the end of the base 11 so as to ensure adjustable solid angle (steradian), and a linear motion mechanism 13 which is attached to a peripheral surface of the spherical joint 12 and which can arbitrarily reciprocate regarding the radial direction R of the joint 12. The serial head 5*a* is attached to the end of the linear motion mechanism 13. According to this mechanism, it is possible to set the linear motion mechanism 13 in a desired position regarding a solid angle direction SR by rotating the joint 12 within the adjustable range of solid angle. Further, it is possible to set the serial head 5*a* at the end of the linear motion mechanism 13 in a desired position regarding the radial direction R by expansion/contraction of the linear motion mechanism 13.

Accordingly, upon printing, it is possible to print a desired image on an inner surface of a concavity provided in the print object 7, e.g., an inner surface of a dome-like building or the like, by driving the joint 12 and the linear motion mechanism 13 as needed while driving the serial head 5*a*.

As the configuration and the moving direction of the print head 5 in the present embodiment, in addition to the variation described with reference to FIG. 4A to FIG. 4F, the following two structures are conceivable.

For example, two flying objects 2 and 2 are connected with a shaft, and a carriage on which the print head 5, inserted through the shaft, is mounted. With this arrangement, the carriage moves straight along the shaft, and also rotates along the shaft. According to this structure, it is possible to arbitrarily move the print head 5 in two directions of the linear direction and the rotation direction.

Further, for example, the print head 5, inserted through a first shaft, is mounted inside an annular first frame. Then the first frame, pivotally supported with a second shaft in a direction orthogonal to the first shaft, is mounted inside an annular second frame larger than the first frame. The print head 5 can rotate in two directions of the rotation direction of the first shaft and the rotation direction of the second shaft.

5. Means to Maintain Distance Between Printer 1 and Print Object 7 (FIG. 5 and FIG. 6)

As described in the section 2, the printer 1 according to the present embodiment uses the print head 5 which is driven in a non-contact state with respect to the print object 7, and which discharges ink droplets from the nozzles to form an image. Accordingly, it is necessary to maintain as constant a gap (referred to as "gap G") between the nozzle surface of the print head 5 and the printing surface of the print object 7 as possible.

FIG. 5 is a diagram explaining means to maintain a gap G constant.

Figure 5A:
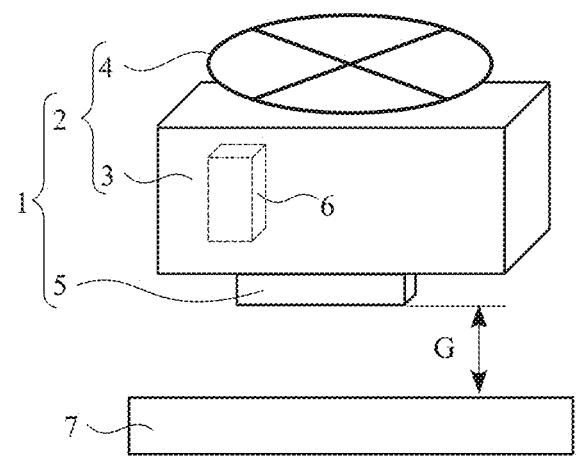
FIG. 5A is a diagram showing means to maintain a constant distance between the print according to the embodiment and the print object.

FIG. 5A is a schematic diagram showing non-contact type gap adjustment to maintain the distance by controlling the flying object 2. By the control of the drive part 4 or the like with the controller 6, the gap G is maintained at a necessary predetermined value, and the ink droplets discharged from the print head 5 are moved in an appropriate state to the print object 7, to form an image in expected accuracy. Height control to maintain the gap G at a necessary predetermined value will be explained in the section 7 described later.

Figure 5B:
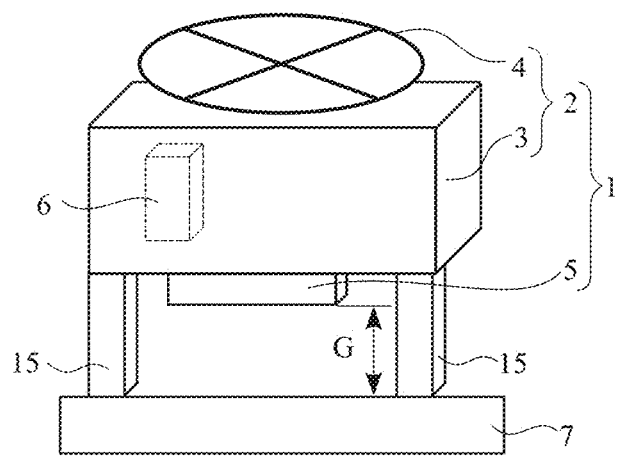
FIG. 5B is a diagram showing the means to maintain a constant distance between the print according to the embodiment and the print object.

FIG. 5B is a schematic diagram showing the contact type gap adjustment to maintain the gap G with a gap adjustment part 15 provided in the flying object 2. The gap adjustment part 15 is a bar-shaped member set to have the same length as the necessary gap G. At least three gap adjustment parts 15 (two gap adjustment parts appear in FIG. 5B) are provided in parallel to each other, so as to surround the print head 5, on the surface of the body part 3 where the print head 5 is provided, in the flying object 2. It is possible to maintain the gap G at a necessary value by bringing the gap adjustment part 15 into contact with the print object 7.

Generally, the print head 5 to perform drawing by discharging ink droplets (IJ head) has μm-level print accuracy. In the printer 1 according to the present embodiment, to achieve the print accuracy at this level, it is necessary to maintain the gap G at a necessary value. However, position setting accuracy by the conventional drone flight control is generally at cm-level. Accordingly, as shown in FIG. 5A, it is necessary to perform gap adjustment to maintain the distance by precise control of the flying object 2, or to perform gap adjustment shown in FIG. 5B to mechanically maintain the gap G at a predetermined value.

Note that when the print head 5 (IJ head) is not used but a spray to spray painting material is mounted in the flying object 2 to perform printing, since the print accuracy of the image is low, a precise gap adjustment means as described with reference to FIG. 5 is not required. As in the case of the conventional drone, there is no problem in normal flight control with cm-level position setting accuracy.

FIG. 6 is a diagram of variation more particularly showing the configuration of the gap adjustment part.

Figure 6A:
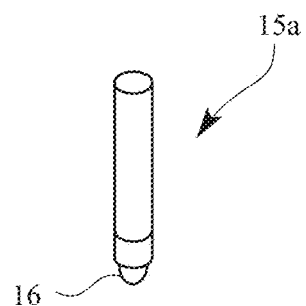
FIG. 6A is a diagram more particularly showing a configuration of the gap adjustment part in the printer according to the embodiment.

A gap adjustment part 15*a* shown in FIG. 6A is a bar body similar to the gap adjustment part 15 shown in FIG. 5B. A rotatable sphere 16 is attached to the end of the gap adjustment part 15*a*. Upon printing, it is possible to smoothly move the print head 5 while maintaining the gap G at a constant value by controlling the flying object 2 to move along the surface of the print object 7 in a state where the sphere 16 of the gap adjustment part 15a is in contact with the print object 7.

Figure 6B:
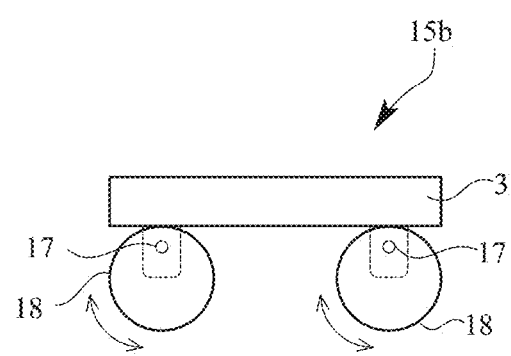
FIG. 6B is a diagram more particularly showing the configuration of the gap adjustment part in the printer according to the embodiment.

FIG. 6B shows a gap adjustment part 15b attached to a surface of the body part 3 in contact with the print object 7 in the flying object 2. The gap adjustment part 15b has three or more cams 18 (two cams 18 appear in FIG. 16B) attached eccentrically via a shaft 17 to the body part 3. The eccentric state and rotation direction of the respective cams 18 are the same. It is possible to set the gap G to a desired value by rotating the cams 18 with unshown driving means. Further, upon printing, the cams 18 are in contact with the print object 7 in peripheral parts. When the flying object 2 is moved in parallel to the print object 7 in this state, the friction force which acts between the cams 18 and the print object 7 is not large. It is possible to smoothly move the printer 1 while maintaining the gap G at a constant value.

Figure 6C:
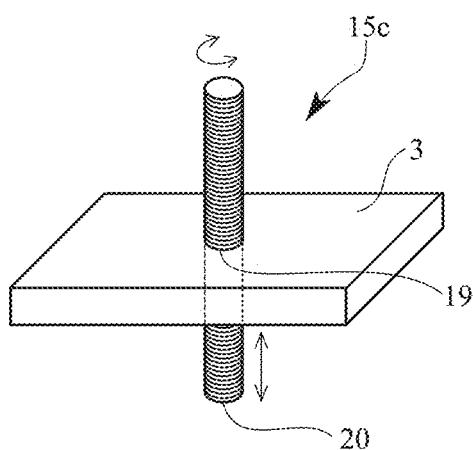
FIG. 6C is a diagram more particularly showing the configuration of the gap adjustment part in the printer according to the embodiment.

A gap adjustment part 15c shown in FIG. 6C is a gap adjustment mechanism which is provided, through the body part 3 of the flying object 2, with its end projected toward the print object 7. The gap adjustment part 15c is provided in three or more positions surrounding the print head 5 (FIG. 6C shows one gap adjustment part 15c). Each gap adjustment part 15c has a female screw 19 provided on a wall of the body part 3, and a screw shaft 20 engaged with the female screw 19. As in the case of the gap adjustment part 15a in FIG. 6A, the sphere 16 may be provided at the end of the screw shaft 20. By rotating the screw shaft 20 with an unshown actuator, it is possible to move the screw shaft 20 straight to adjust the length of projection from the body part 3 to the print object 7 and to set the gap G with a desired value.

Note that when an image is printed by using the print head 5 (IJ head), it is desirable that the gap G between the print head 5 and the printing surface is as small as possible. The smaller the gap G is, the higher the accuracy of the obtained image is. However, when the print object 7 is the ground or the surface of a building, it may be impossible to set the gap G with a small value due to coarseness of the surface. Even in such case, as in the case of the gap adjustment part shown in FIG. 6B and FIG. 6C, as long as the gap G is not a constant value but the gap G can be arbitrarily set within a predetermined range, it is possible to set the gap G with an appropriate value in accordance with surface state of the print object 7. When the surface state of the print object 7 can be predicted, the controller 6 may be instructed such that the gap adjustment part 15b or 15c can previously set a necessary gap G. Otherwise, it may be configured such that the printer 1 actually approaches the vicinity of the print object 7, then the surface of the print object 7 is observed with a camera or the like, and in accordance with the result, the gap adjustment part 15b or 15c sets a necessary gap G.

6. Configurations of Ink Tank and Head Power Source (FIG. 7)

The printer 1 or 1a according to the embodiment is a device to fly the flying object 2 or 2a in which the print head 5 is mounted to approach the print object 7 and print a desired image in a predetermined position of the print object 7, on the assumption of sending the flying object 2 or 2a to approach the print object 7 at a high place or remote place, and image formation in a comparatively wide area of the print object 7. For these purposes, it is preferable that an ink supply source to supply ink to the print head 5 and a head power source to drive the print head 5 have appropriate capacity. In that case, the weights of the ink supply source and the head power source are heavy, accordingly, the problem is how to set the structural relationship among the ink supply source and the head power source, and the flying objects 2 or 2a (i.e., the printer 1 or 1a). Three solutions shown in FIG. 7A and FIG. 7C and operations of the solutions will be described below.

Figure 7A:
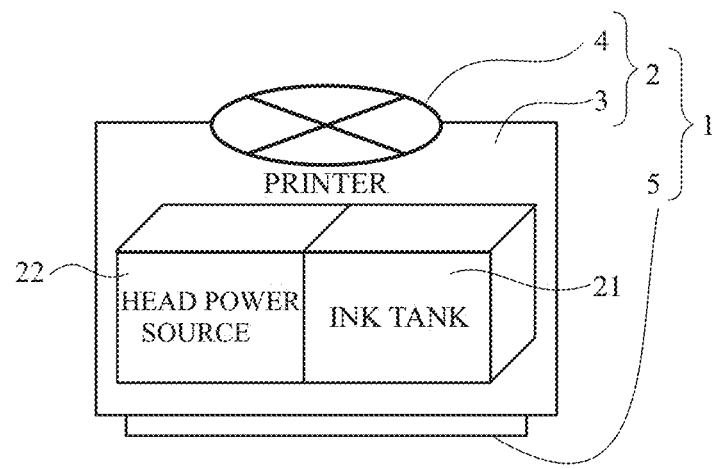
FIG. 7A is a diagram showing configurations of the respective parts, i.e., the flying object having the print head, an ink supply source to supply ink to the print head, and a head power source to drive the print head.

FIG. 7A is a schematic diagram showing an integral type configuration where an ink tank 21 as an ink supply source and a head power source 22 to drive the print head 5 are accommodated in the body part 3 of the printer 1.

According to the integral type printer 1 shown in FIG. 7A, the configuration is simple and the production cost is low in comparison with a stand-alone type (FIG. 7B) and a separation/connection type (FIG. 7C) printers to be described later. On the other hand, the entire printer 1 is large and heavy. Accordingly, it is more difficult to maintain the gap G constant by flight control, and image printing by moving the printer itself as described with reference to FIG. 3(a). Accordingly, as the gap adjustment method described with reference to FIG. 5, not the non-contact type method (FIG. 5A) but the contact type method (FIG. 5B) is preferable. Choices of methods are limited.

According to the integral type printer 1 shown in FIG. 7A, as the printer 1 has the ink tank 21 to supply ink to the print head 5 and the head power source 22 to drive the print head 5, it is possible to drive the print head 5 for hours, and supply the stored large amount of ink to the print head 5. Accordingly, it is possible to print an image having a large area on the print object 7.

Figure 7B:
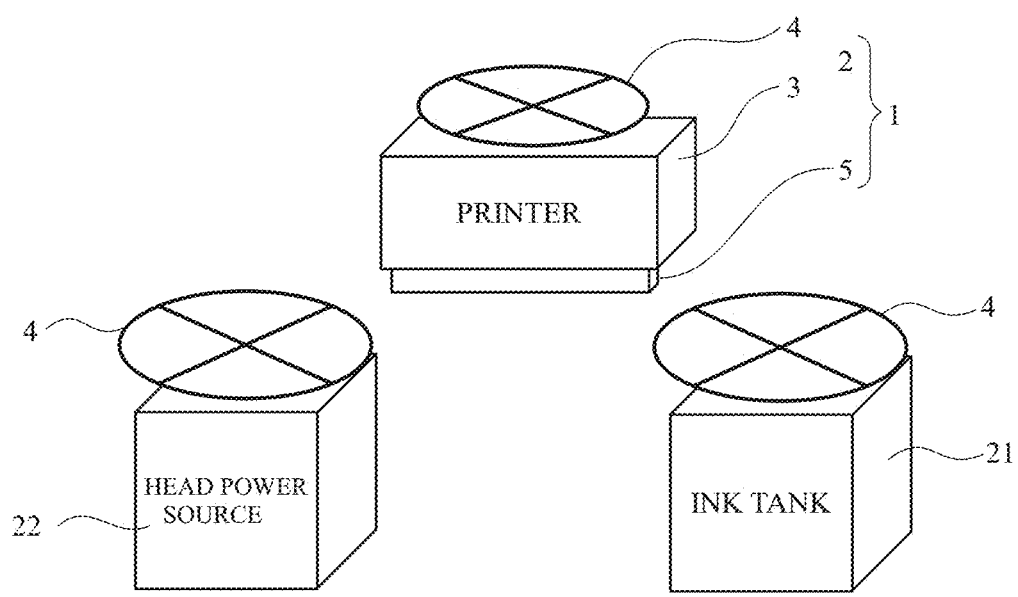
FIG. 7B is a diagram showing configurations of the respective parts, i.e., the flying object having the print head, the ink supply source to supply ink to the print head, and the head power source to drive the print head.

FIG. 7B is a schematic diagram of a configuration where the ink tank 21 and the head power source 22 to drive the print head 5 are separate bodies from the printer 1. The ink tank 21 and the head power source 22 are respectively provided with the drive part 4 for flight, and are independently flyable.

According to the stand-alone printer 1 shown in FIG. 7B, the ink tank 21 and the print head 5 of the flying object 2 are previously connected with a tube or the like, otherwise, approach the print object 7, then the tube or the like is extended from the ink tank 21 or the flying object 2 and connected to the other part, and ink is supplied from the ink tank 21 to the print head 5. Further, the head power source 22 performs cable or wireless power supply to the print head 5. Accordingly, the ink tank 21 and the head power source 22 independent of the printer 1 may hover in the vicinity of the printer 1. That is, it is not necessary to perform position control on the ink tank 21 and the head power source 22 with high accuracy as in the case of the printer 1 which performs printing with the print head 5.

Further, when the moving range of the printer 1 corresponding to the size of an image to be printed is narrow and there is no difficulty in supply of ink and power, the ink tank 21 and the head power source 22 may be landed in the vicinity of the flying object 2. In such case, the ink tank 21 and the head power source 22 are stopped, and the position control is not necessary.

Further, the printer 1 can be configured to be small and light in comparison with the printer including the ink tank 21 and the head power source 22. Accordingly, the position control of the flying object 2 with high accuracy for image formation can be more easily performed in comparison with the case where the printer is heavy and large.

Figure 7C:
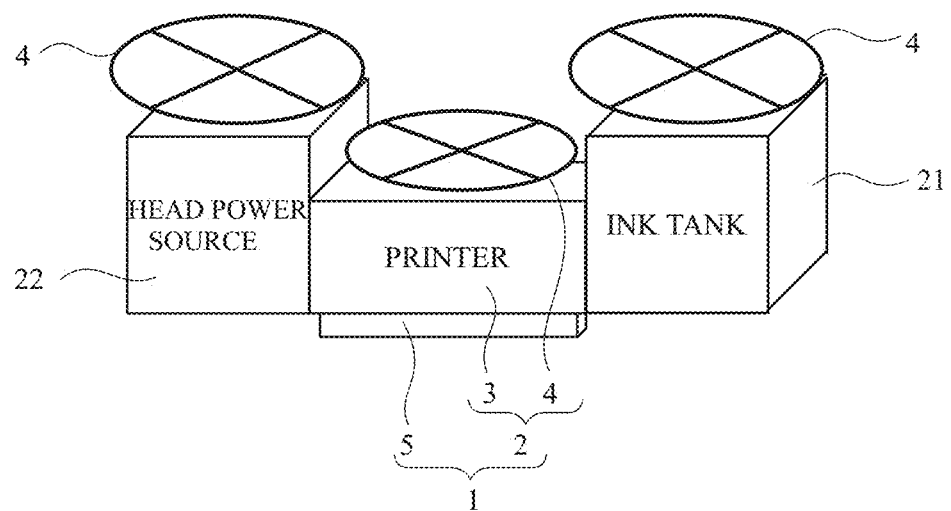
FIG. 7C is a diagram showing configurations of the respective parts, i.e., the flying object having the print head, the ink supply source to supply ink to the print head, and the head power source to drive the print head.

FIG. 7C is a schematic diagram of a configuration where the ink tank 21 and the head power source 22 are separate bodies from the printer 1, respectively have the drive part 4 for flight and are flyable, and further, are respectively connectable or separable with respect to the flying object 2.

According to the separation/connection type printer 1 shown in FIG. 7C, it is possible to connect or separate the printer 1, the ink tank 21 and the head power source 22, mutually arbitrarily as needed. Accordingly, it is possible to arbitrarily determine the number, the types, and the combination of the printers 1, in accordance with design, size or the like of an image to be printed. For example, as many printers 1 as necessary can be combined in an array to form a line head type configuration, to increase the area of printing with one operation. Further, it is possible to arbitrarily combine plurality of printers 1 in which the print heads 5 for different colors of ink to be discharged are mounted, and perform multicolor printing with one operation.

Further, when the ink supplied to the print head 5 and/or the power source to drive the print head 5 is exhausted during printing, the depleted ink tank 21 and the depleted head power source 22 are separated from the printer 1, and returned to the departure point. The printer 1 is caused to wait in the vicinity of the print object 7. Then a full ink tank 21 and a charged head power source 22 are newly dispatched from the departure point to the vicinity of the print object 7. The ink tank 21 and the head power source are connected to the printer 1 which waits in the vicinity of the print object 7. Thus, it is possible to continue printing. To avoid interruption of the printing, it may be configured such that the full ink tank 21 and the charged head power source 22 are caused to wait in the vicinity of the print object 7 for the timing of exhaustion of the ink in the ink tank 21 and the power of the head power source 22.

Note that in the respective configuration examples shown in FIG. 7, although not shown, the ink tank 21 is provided with a pump to send ink. The head power source 22 may be used for driving this pump, or a power source specialized for the pump may be provided in the ink tank 21.

7. Position Control of Printer 1 (FIG. 8)

The printer 1 according to the present embodiment rises from a departure point, flies to a destination, checks the print object 7 then moves closer to a necessary distance, and drives the print head 5 in a state where the gap G is maintained between the printer 1 and the print object 7, to print a designated image on the print object 7. Note that flight control to the destination and flight control to approach the print object 7 above the destination are performed as follows.

1) Flight Control to Destination

The position control upon movement from the departure position to the print object 7 includes control of altitude position and plane position, and is performed by control utilizing GPS.

2) Flight Control to Approach Target Point of Print Object 7 (1)

After the arrival at the position above the destination, in order to land the printer 1 to the target point of the print object 7, and print an image only by moving the print head 5 without moving the printer 1, only flight control to the destination performed by utilizing GPS is required as position control of the printer 1.

However, after the arrival at the position above the destination, the position control to detect a particular point in the print object 7 and cause the printer 1 to approach the point and perform image printing with the print head 5 at the particular point, is based on image information obtained with a camera 23 mounted in the printer 1. The position control is mainly control of plane position in the area of the print object 7. Note that the explanation here is made with the print object 7 as the ground surface.

Figure 8A:
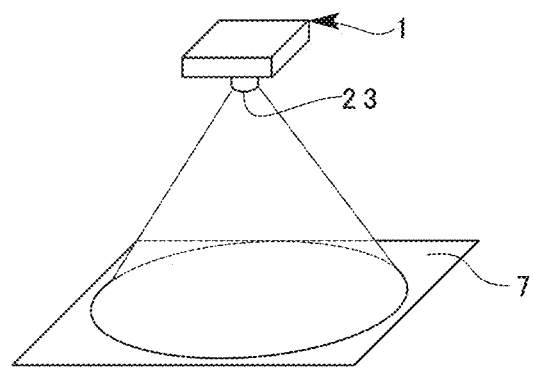
FIG. 8A is a schematic diagram for explaining position control in the print object of the printer according to the embodiment.

As shown in FIG. 8A, the printer 1, which has arrived at the position above the destination as the print object 7, performs image sensing on the ground surface with the camera 23, and obtains image data of a predetermined region. The printer 1 previously holds data on characteristic pattern of the ground surface as a print target in the controller 6.

Figure 8B:
FIG. 8B is a schematic diagram for explaining the position control in the print object of the printer according to the embodiment.

As shown in FIG. 8B, the controller 6 of the printer 1 recognizes the image data, obtained regarding the range shown in FIG. 8A, via a coordinate system formed with a grid based on one or plural pixels as a unit. Then the controller 6 compares the previously given pattern with the image data, and searches whether or not the pattern exists in the image data. When the pattern which corresponds to the pattern is recognized in the image data, plural grids surrounding the grid in which the pattern has been recognized are specified in the coordinate system of the image data. In FIG. 8B, nine grids surrounded with a bold line are specified (this is referred to as a "specified grid group").

Figure 8C:
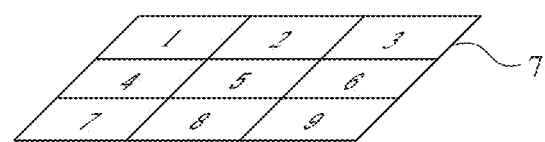
FIG. 8C is a schematic diagram for explaining the position control in the print object of the printer according to the embodiment.

The printer 1 increases the rate of magnification of the camera 23, or moves the flying object 2 down, to enlarge the range of the image captured with the camera 23 from the state in FIG. 8B to the state in FIG. 8C, thus narrowing down the position of the pattern as the print target. For the sake of convenience, numerals 1 to 9 are allotted to the respective grids of the specified grid group. The grid in which the pattern has been recognized is indicated with numeral 5.

Figure 8D:
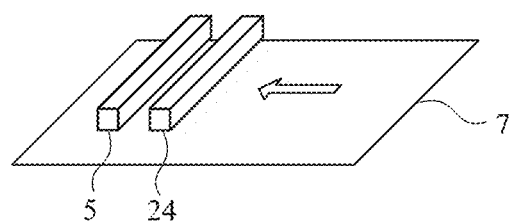
FIG. 8D is a schematic diagram for explaining the position control in the print object of the printer according to the embodiment.

The printer 1 moves down to the position of the specified grid group shown in FIG. 8C, and as shown in FIG. 8D, scans the ground surface of the print object 7 with a CIS 24 (Contact Image Sensor) as an image acquisition device mounted in the flying object 2, along the direction of an arrow from one edge toward the other edge of the specified grid group. When the pattern is detected in the position of the pattern as the print target (the grid No. 5), the print head 5 is driven, to print a designated image on the position of the pattern (the grid No. 5). Note that the image acquisition device is not limited to the CIS, but a CCD, a CMOS, or the like, may be used. It is not necessary to limit the type of image acquisition device technically.

Further, it may be configured such that in the above control, upon altitude position control of the printer 1, in addition to the camera 23, another camera is mounted, as dual camera altitude measurement. Further, the altitude measurement may be performed by laser measurement or ultrasonic measurement.

Note that in the position control of the printer 1 described with reference to FIG. 8, the image obtained with the camera 23 is recognized via the coordinate system formed with pixels as constituent units. The same pattern as the above pattern is searched, and the grid in which the pattern exists is extracted from the image. However, as long as it is possible to detect the pattern as the target in the image obtained with the camera 23 and specify the position, coordinate image representation is merely means for solving the problem. Accordingly, the position of the pattern may be specified with other methods than the coordinate representation. For example, the entire image is obtained by image-sensing a comparatively wide range of the ground surface with the camera 23 of the printer 1 floating above, then the printer 1 approaches a comparatively narrow part where the pattern has been detected in the image, and moves down to obtain a partial image obtained by image sensing of the corresponding part. By comparing the entire image with the pattern in the partial image, it is possible to obtain positional information of the print position indicating the position of the pattern in the entire image.

3) Flight Control to Approach Target Point of Print Object 7 (2)

A flying object for image sensing with a camera is prepared in addition to the printer 1. By image sensing the printer 1 with this flying object for image sensing, it is possible to perform flight control to cause the printer 1 to approach the target point of the print object 7. That is, when image sensing is performed with the flying object for image sensing provided above the printer 1 positioned below, an image where the printer 1 overlaps on the image of the ground surface as the print object 7 is obtained. Accordingly, position control information is sent from the flying object 2 for image sensing to the printer 1 such that the printer 1 moves toward the target point. Further, it may be configured such that the image data obtained with the flying object for image sensing is sent to the printer 1, then the controller 6 of the printer 1 generates the position control information by itself and the printer moves toward the target point.

As described above, according to the position control of the printer 1 according to the embodiment, the image of the print object obtained by image sensing with the camera is compared with the stored pattern of the print object so as to specify the print position. The printer 1 moves to the print position, then forms an image in the position where the pattern has actually been detected with the image sensor. Accordingly, it is possible to print an image with exact position accuracy even with respect to a target position set on a print object in a position away from a departure point.

8. Another Shape of Flying Object (FIG. 9)

Among the flying objects of the printer in the above-described embodiment, the flying object in FIG. 1 is schematically shown as the structure where the single propeller is provided on the upper surface of the rectangular box. Further, in the more particular diagram of FIG. 3, the structure where four propellers are provided on the annular frame 3a is shown. In these structures, as described above, it is possible to perform printing on a lower surface or a side surface, in a concave surface, of a structure, in addition to the ground surface, by appropriately controlling the attitude of the machine.

Figure 9:
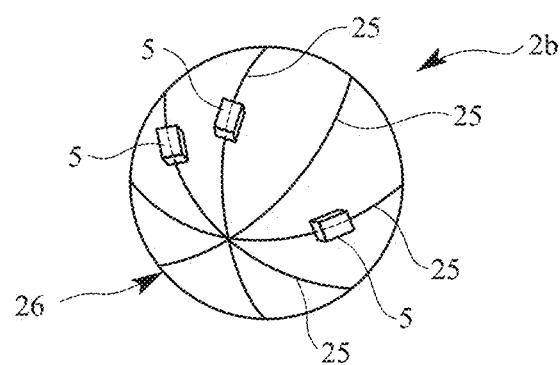
FIG. 9 is a schematic diagram showing a structure of the flying object and variation of a print-head moving mechanism in the printer according to the embodiment.

However, a flying object 2b to perform printing, without difficulty, on a lower surface, a side surface, in a concave surface, and the like, of a structure, is shown in FIG. 9. The flying object 2b has a spherical body part 26 which is a combination of plural ring frames 25. An unshown propeller exists inside the body part 26, therefore the flying object can fly. Further, in addition to the propeller, a controller, a tank, a power source, a camera, and the like are provided inside the body part 26. In each frame 25, the print head 5 is movably attached to other parts than at least a connection part between the frame 25 and the frame 25. The nozzle surface of the print head 5 is configured so as to maintain the gap G even when the flying object 2 comes into contact with the print object 7. The respective print heads 5 can move to an arbitrary position within an about 180 degrees angle range along the frame 25. Further, since the flying object 2 can arbitrarily rotate to control the attitude, it is possible to perform printing within a 360 degrees range regarding all the directions outside the body part 26.

According to the spherical printer 1b, it is possible to print a desired image, without difficulty, in a cylinder and on an inner surface (lower surface) of a dome ceiling.

9. Print Path Upon Image Formation with Connected Type Printer 1 (FIG. 10 and FIG. 11)

Figure 10A:
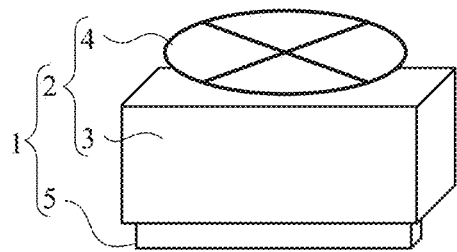
FIG. 10A is a diagram showing the printer which is connectable or separable, according to the embodiment.
Figure 10B:
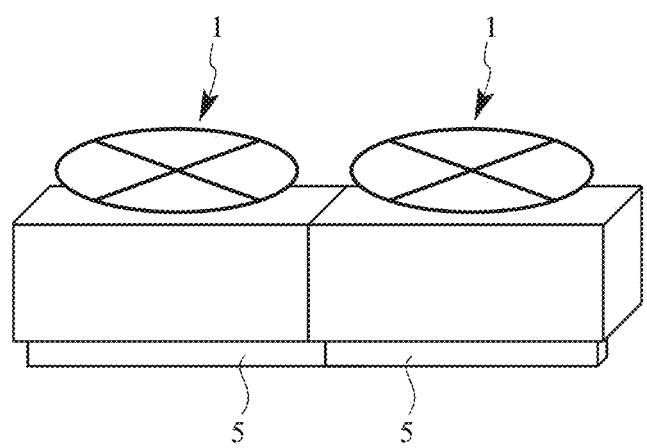
FIG. 10B is a diagram showing the printer which is connectable or separable, according to the embodiment.

The printer 1 shown in FIG. 10A has approximately the same structure as the structure of the printer 1 shown in FIG. 1. As shown in FIG. 10B, two printers 1 can be arrayed and connected to each other along the longitudinal direction of the print head 5. Although not shown, three or more printers may be similarly connected to each other. The connected plural printers 1 can fly as in the case of the single printer 1 under the control of the controller 6. Further, when connected, the respective print heads 5 of the plural printers 1 are integrated as printing means. That is, it is possible to form a print head longer than the case of the single printer 1 by connecting the plural print heads 5. In a joint of connection between the print heads 5, the state of nozzle array is the same as other parts, and the nozzle array pattern to the nozzle pitch are constant as a whole. Note that in this example, the print head 5 of each printer 1 may be the serial head 5a or may be the line head 5b.

FIG. 11 is a diagram showing a print path upon image formation on the print object 7 with the connectable or separable printer 1 according to the embodiment. In the figure, the image printed on the print object 7 is indicated as letters "A" and "B", and the locus of the movement of the print head 5, i.e., the print path is indicated with a solid-line arrow.

As described with reference to FIG. 11 below, the printer 1, alone or in a state where plural printers are connected, can print an image by driving the print head 5 while moving through the shortest moving path, and at the same time maintain the gap G between the printer 1 and the print object 7. Otherwise, the printer 1, alone or in a state where plural printers are connected, can stop above the print object 7 in a state where the gap G is maintained, and move the print head 5 through the shortest moving path, to print an image. It is determined whether the printer 1 itself moves or the printer 1 stands still but the print head 5 moves, in accordance with relative comparison between the size of an image to be printed and the range printable with the printer 1.

Figure 11A:
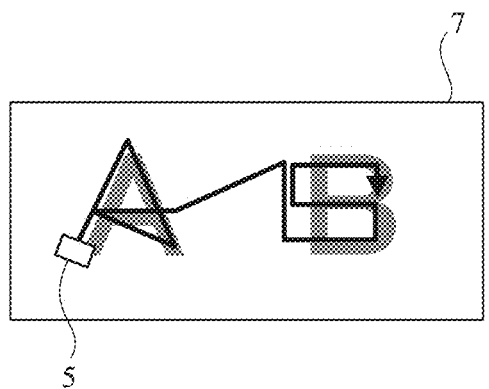
FIG. 11A is a diagram showing a print path upon image formation on the print object with the printer which is connectable or separable, according to the embodiment.

FIG. 11A shows an example where the letters "A" and "B" are printed through the shortest print path with the single print head 5 of the single printer 1 shown in FIG. 10A.

Figure 11B:
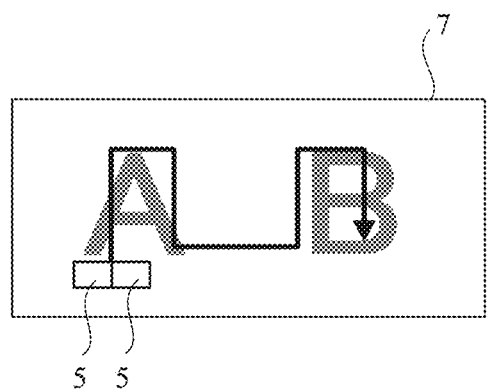
FIG. 11B is a diagram showing the print path upon image formation on the print object with the printer which is connectable or separable, according to the embodiment.

FIG. 11B shows an example where the letters "A" and "B" are printed through the shortest print path with the integrated two print heads 5, by using the printer 1 in FIG. 10B obtained by connecting two printers 1 each shown in FIG. 10A.

Figure 11C:
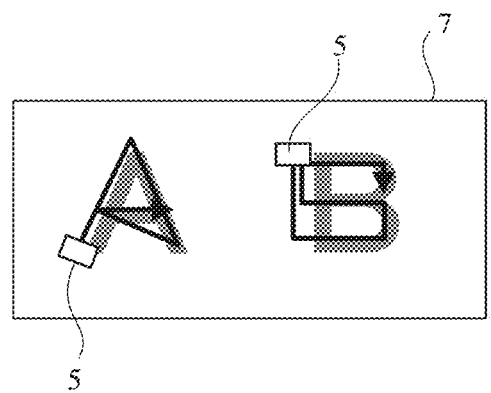
FIG. 11C is a diagram showing the print path upon image formation on the print object with the printer which is connectable or separable, according to the embodiment.

FIG. 11C shows an example where the letters "A" and "B" are simultaneously printed respectively through the shortest print path, by using two printers 1 each shown in FIG. 10A, and by independently and simultaneously driving the respective print heads 5.

Figure 11D:
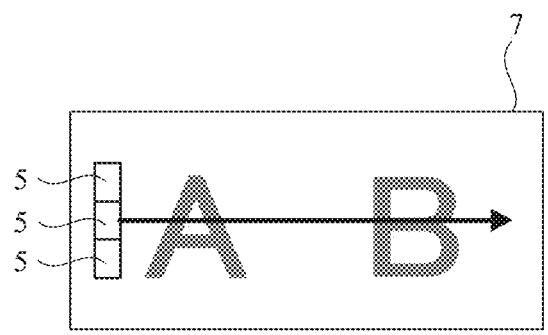
FIG. 11D is a diagram showing the print path upon image formation on the print object with the printer which is connectable or separable, according to the embodiment.

FIG. 11D shows an example where the letters "A" and "B" are printed through the shortest print path, with integrated three print heads 5, by using the printer 1 obtained by connecting three printers 1 each shown in FIG. 10A.

Figure 11E:
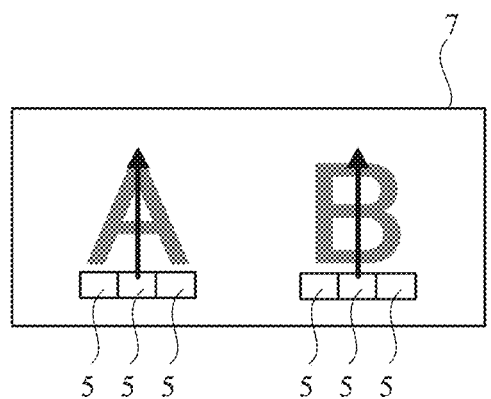
FIG. 11E is a diagram showing the print path upon image formation on the print object with the printer which is connectable or separable, according to the embodiment.

FIG. 11E shows an example where the letters "A" and "B" are simultaneously printed respectively through the shortest print path, by using two sets of connected three printers 1, and by independently and simultaneously driving integrated three print heads 5 of the respective sets.

The above-described shortest print path is determined in accordance with the number and combination of print heads 5 and image to be printed, so as to satisfy the following conditions.

That is, assuming that the printing surface of the letter "A" is A, and the printing surface of the letter "B" is B, as a necessary printing area S1, S1=A+B holds.

Further, assuming that the width of the print head 5 is W, and the distance of movement of the print head 5 in a direction orthogonal to the width direction is L, as an area S2 of a range printable with the print head 5, S2=W×L holds.

Accordingly, when the print head 5 prints the letters "A" and "B" through the shortest print path, the following two conditions (1) and (2) are established.

$$S1 < S2 \quad (1)$$

$$L \ll MIN \quad (2) \text{ (L is set to the minimum)}$$

The controller 6 calculates the moving route of the flying object 2 or the moving route of the print head 5 to satisfy the above two conditions, and controls the movement of the flying object 2 or the movement of the print head 5.

In this manner, by moving the flying object 2 or the print head 5 through the shortest route as described above in accordance with size, layout and the like of an image to be printed, it is possible to reduce print time as much as possible. Further, it is also possible to reduce print time as much as possible by appropriately setting the number of connected printers 1 in accordance with print contents.

In the above-described embodiment, the example of image printing on the print object surface by discharging ink droplets with the print head has been explained. The liquid discharged from the print head is not limited to ink. For example, it is possible to print a circuit pattern by discharging silver paste. Further, the printer can be used like a 3D printer to form a three-dimensional structure by discharging and piling up resin. Further, it is possible to discharge an adhesive agent. Further, it is possible to discharge edible paste on the surface of food, thus it is possible to perform necessary printing. Furthermore, it is possible to discharge a repairing material to repair a crack of a structure.

In the above-described embodiment, it is possible to print a high-definition image by performing printing while maintaining the gap G between the printer 1 or 1a (or the print head 5) and the print object 7 at a constant value. However, in the case of outdoor printing, it is conceivable that it is not possible to form a high-definition image when the discharged ink flows due to the influence of wind. To prevent such influence of wind, a wind shield wall may be provided on the print object side of the body part in the printer 1 or 1a. It is desirable that the wall has a size to surround the print head 5, and approximately cover the gap G, but not to be in contact with the print object.

10. Configuration and its Effects of Printer According to Respective Aspects in Embodiment The printer according to the first aspect has the flying object, and the print head, mounted in the flying object, to print a desired image, in a non-contact state on a print object which the flying object has approached.

According to the printer according to the first aspect, it is possible to print a desired image on the print object by flying the flying object from the departure point to the vicinity of the print object, and driving the print head in the non-contact state with respect to the print object.

The feature of the printer according to the second aspect is that in the printer according to the first aspect, the flying object has the body part, and the drive part, mounted in the body part, to fly the body part. The print head is attached to a predetermined position of the body part. The printer further has the controller that drives the print head while moving the flying object and at the same time maintaining the distance between the flying object and the print object at a predetermined value.

According to the printer according to the second aspect, it is possible to print a desired image on the print object by driving the print head while moving the flying object within the printing surface of the print object and at the same time maintaining the distance between the flying object and the print object at a predetermined value.

The feature of the printer according to the third aspect is that in the printer according to the first aspect, the flying object has the body part and the drive part, mounted in the body part, that flies the body part. The print head is attached arbitrarily movably in at least two different directions with respect to the body part. The flying object further has the controller that drives the print head while moving the print head, and at the same time fixing the position of the flying object with respect to the print object.

According to the printer according to the third aspect, it is possible to print a desired image on the print object by driving the print head while moving the print head within the printing surface of the print object, and at the same time fixing the position of the flying object with respect to the print object.

The feature of the printer according to the fourth aspect is that, in the printer according to the second or third aspect, upon image printing, the controller controls the drive part so as to maintain the distance between the flying object and the print object at a predetermined value.

According to the printer according to the fourth aspect, upon image printing on the print object, it is possible to maintain the distance between the print head and the print object at a predetermined value by controlling the drive part of the flying object. Accordingly, regardless of the state of the surface of the print object, it is possible to print a desired image in good image quality.

The feature of the printer according to the fifth aspect is that the printer according to the second or third aspect has the gap adjustment part, attached to the body part, that comes into contact with the print object upon image printing, to maintain the distance between the print head and the print object at a predetermined value.

According to the printer according to the fifth aspect, upon image printing on the print object, since the gap adjustment part attached to the body part of the flying object comes into contact with the print object, it is possible to maintain the distance between the print head and the print object at a predetermined value. Accordingly, regardless of state of the surface of the print object, it is possible to print a desired image in good image quality.

The feature of the printer according to the sixth aspect is that the printer according to one of the first to fifth aspects has the ink supply source to supply ink to the print head, and the head power source to drive the print head.

According to the printer according to the sixth aspect, since the printer has the ink supply source to supply ink to the print head and the head power source to drive the print head, it is possible to supply a large amount of ink to the print head, and to drive the print head over a long time. Accordingly, it is possible to print an image having a large area on the print object.

The feature of the printer according to the seventh aspect is that in the printer according to the sixth aspect, the ink supply source is independently flyable with the drive part for flight, and the head power source is independently flyable with the drive part for flight.

According to the printer according to the seventh aspect, the ink supply source and the head power source are independent of the flying object in which the print head is mounted. It is possible to supply ink with a tube or the like to the print head, and perform cable or wireless power supply to the print head. Accordingly, the ink supply source and the head power source independent of the flying object may hover in the vicinity of the flying object. That is, it is not necessary to perform high-accuracy position control on the ink supply source and the head power source as in the case of the flying object that performs printing with the print head. Further, when the size of an image to be printed or the moving range of the flying object corresponding to the size is narrow to a certain degree, and there is no trouble in ink or power supply, the ink supply source and the head power source may be landed in the vicinity of the flying object. In such case, the ink supply source and the head power source are stopped, and it is not necessary to perform position control. Further, the flying object in which the print head is mounted can be small and light in comparison with the case where the flying object includes the ink supply source and the head power source. Accordingly, it is possible to perform high-accuracy position control on the flying object for image forming more easily in comparison with the case where the flying object is heavy and large.

The feature of the printer according to the eighth aspect is that in the printer according to the seventh aspect, the ink supply source and the head power source are respectively connectable or separable with respect to the flying object.

According to the printer according to the eighth aspect, the flying object in which the print head is mounted, the ink supply source, and the head power source can be mutually arbitrarily connected or separated. Accordingly, it is possible to arbitrarily determine the number and combination of flying objects in which the print heads are mounted in accordance with design, size, or the like of an image to be printed. For example, it is possible to combine a necessary number of flying objects in an array, as a line-head shaped configuration, thus enlarging the area printable at one time of operation. Further, it is also possible to arbitrarily combine plural flying objects in which the print heads for different colors of ink to be discharged are mounted, so as to perform multicolor printing at one time of operation.

Further, when the ink supplied to the print head and power to drive the print head run out during printing, the depleted ink supply source and the depleted head power source are separated from the flying object, and returned to the departure point. The flying object is made to wait in the vicinity of the print object. Then a full ink supply source and a fully charged head power source are newly dispatched from the departure point to the vicinity of the print object, and connected to the flying object waiting in the vicinity of the print object. With this configuration, it is possible to continue printing. To avoid interruption of the printing, it may be configured such that the full ink supply source and the fully charged head power source are made to wait in the vicinity of the print object for the timing of exhaustion of the ink in the ink supply source and the power of the head power source.

The feature of the printer according to the ninth aspect is that in the printer according to one of the first to eighth aspects, the controller controls at least one of the flying object and the print head so as to print an image to be printed through the shortest moving route.

According to the printer according to the ninth aspect, upon printing, it is possible to reduce as much print time as possible by moving the flying object or the print head through the shortest route in accordance with image to be printed. Further, it is also possible to reduce as much print time as possible by appropriately setting the number of connected printers in accordance with image to be printed.

The feature of the printer according to the tenth aspect is that the printer according to one of the first to ninth aspects further has the camera to obtain an image of the print object and the image sensor to detect the pattern of the print object.

The controller previously holds the pattern of the print object as a target. The controller compares the image of the print object obtained with the camera with the pattern to specify a print position. The controller moves the flying object to the print position. The controller controls the flying object and the print head so as to scan the print object with the image sensor and print the image in the position where the pattern has been detected.

According to the printer according to the tenth aspect, the image of the print object obtained by image sensing with the camera is compared with the stored pattern of the print object, to specify the print position. Then the flying object moves to the print position, and forms an image in the position where the pattern has been actually detected with the image sensor. Accordingly, it is possible to print an image with exact position accuracy with respect to a target position set on a print object in a position away from a departure point.

LIST OF REFERENE SIGNS 1, 1a . . . printer
2, 2a, 2b . . . flying object
3, 26 . . . body part
3a . . . annular frame as body part
4 . . . drive part
4a . . . propeller as drive part
5 . . . print head
5a . . . serial head as print head
5b . . . line head as print head
6 . . . controller
15, 15a, 15b, 15c . . . gap adjustment part
21 . . . ink tank as ink supply source
22 . . . head power source

The invention claimed is:

1. A printer comprising:
a flying object; and
a print head, mounted in the flying object, that prints a desired image in a non-contact state on a print object which the flying object has approached,
wherein, the flying object has a body part, and a drive part, mounted in the body part, that flies the body part,
wherein the print head is attached to a predetermined position of the body part,
wherein the printer further comprises a controller that drives the print head while moving the flying object and at the same time maintaining a distance between the flying object and the print object at a predetermined value,
wherein the printer further comprises a gap adjustment part, attached to the body part, that comes into contact with the print object upon image printing, to maintain the distance between the print head and the print object at the predetermined value,
wherein the printer further comprises an ink supply source to supply ink to the print head, and a head power source to drive the print head, and
wherein the ink supply source is independently flyable with a drive part for flight, and the head power source is independently flyable with the drive part for flight.

2. The printer according to claim 1, wherein the controller controls at least one of the flying object and the print head so as to print an image to be printed through a shortest moving route.

3. The printer according to claim 1, further comprising:
a camera that obtains an image of the print object; and
an image sensor that detects a pattern of the print object, wherein the controller previously holds the pattern of the print object as a target, compares the image of the print object obtained with the camera with the pattern to specify a print position, moves the flying object to the print position, and controls the flying object and the print head so as to scan the print object with the image sensor and print the image in a position where the pattern has been detected.

4. The printer according to claim 1, wherein the print head is configured to be moved linearly during printing by a printing moving mechanism to print the desired image on the print object without moving the flying object during printing.

5. The printer according to claim 1, further comprising an ink supply source configured to supply ink to the print head, wherein the ink supply source is independently flyable using a drive part for flight, independent of the flying of the flying object.

6. The printer according to claim 1, wherein the gap adjustment part comprises a bar-shaped member having the same length as the predetermined value of the distance between the print head and the print object.

7. The printer according to claim 6, wherein the bar-shaped member of the gap adjustment part is configured to produce μm-level print accuracy by the print head.

8. A printer comprising:
a flying object; and
a print head, mounted in the flying object, that prints a desired image in a non-contact state on a print object which the flying object has approached,
wherein the printer further comprises an ink supply source to supply ink to the print head, and a head power source to drive the print head,
wherein the ink supply source and the head power source are respectively connectable or separable with respect to the flying object, and
wherein the ink supply source and the head power source are accommodated in separate additional flying objects when connected to the flying object.

9. A printer comprising:
a flying object; and
a print head, mounted in the flying object, that prints a desired image in a non-contact state on a print object which the flying object has approached,
wherein, the flying object has a body part, and a drive part, mounted in the body part, that flies the body part,
wherein the print head is attached to a predetermined position of the body part,
wherein the printer further comprises a controller that drives the print head while moving the flying object and at the same time maintaining a distance between the flying object and the print object at a predetermined value,
wherein the printer further comprises a gap adjustment part, attached to the body part, that comes into contact with the print object upon image printing, to maintain the distance between the print head and the print object at the predetermined value, and
wherein the gap adjustment part comprises at least three bar-shaped members extending parallel to each other and each having the same length as the predetermined value of the distance between the print head and the print object.

10. A printer comprising:
a flying object; and
a print head, mounted in the flying object, that prints a desired image in a non-contact state on a print object which the flying object has approached,
wherein, the flying object has a body part, and a drive part, mounted in the body part, that flies the body part,
wherein the print head is attached to a predetermined position of the body part,
wherein the printer further comprises a controller that drives the print head while moving the flying object and at the same time maintaining a distance between the flying object and the print object at a predetermined value,
wherein the printer further comprises a gap adjustment part, attached to the body part, that comes into contact with the print object upon image printing, to maintain the distance between the print head and the print object at the predetermined value, and
wherein the printer further comprises an ink supply source configured to supply ink to the print head, the ink supply source being independently flyable using a drive part for flight, independent of the flying of the flying object.

* * * * *